United States Patent [19]

Jepson et al.

[11] Patent Number: 4,743,306

[45] Date of Patent: May 10, 1988

[54] ORGANOPHILIC COMPOSITIONS

[75] Inventors: Walter B. Jepson; Howard Goodman, both of St. Austell, England

[73] Assignee: ECC International Limited, Great Britain

[21] Appl. No.: 940,988

[22] Filed: Dec. 12, 1986

[30] Foreign Application Priority Data

Dec. 19, 1985 [GB] United Kingdom ............... 8531254

[51] Int. Cl.$^4$ .............................................. C04B 14/00
[52] U.S. Cl. ................... 106/308 N; 524/445; 524/447
[58] Field of Search ............... 106/287.25, 308 N, 22; 501/147

[56] References Cited

U.S. PATENT DOCUMENTS 3,945,836  3/1976  Miyata ................................. 106/22
4,240,951 12/1980  Moll, Jr. et al. ................ 106/308 N
4,569,923  2/1986  Knudson, Jr. et al. ......... 106/308 N
4,623,398 11/1986  Goodman et al. ............. 106/308 N
4,631,091 12/1986  Goodman ....................... 106/308 N Primary Examiner—Theodore Morris
Attorney, Agent, or Firm—Stefan J. Klauber

[57] ABSTRACT

There is disclosed an organophilic composition which comprises a mixture of a smectite clay and a particulate second inorganic material, the mixture having been treated with a quaternary ammonium compound which is capable of rendering the smectite clay organophilic and the second inorganic material constituting at least 10% by weight of the mixture of smectite clay, second inorganic material and quaternary ammonium compound.

The organophilic composition is useful for gelling organic solvents and compositions containing organic solvents.

7 Claims, No Drawings

ORGANOPHILIC COMPOSITIONS

This invention relates to organophilic compositions and more particularly but not exclusively is concerned with organophilic compositions suitable for improving the thixotropic properties of cross-linkable unsaturated polyester resin compositions and for gelling organic solvents and compositions containing significant amounts of organic solvents. The present invention is also concerned with a process for preparing organophilic compositions.

BACKGROUND OF THE INVENTION

Unsaturated polyester resin compositions containing gelling agents, or gellants, are well-known. For example, in the preparation of glass fibre laminates using unsaturated polyester resins as the bonding agent, it is known to use thixotropic gelling agents which permit easy mixing and spraying of the resins at high shear rates but which greatly increase the viscosity of the resins at low shear rates thus inhibiting the drainage of the resins on vertical sufaces. One of the most effective gelling agents for unsaturated polyester resins is a silica aerogel which is typically added to a solution of the resin in an unsaturated aromatic monomer, such as styrene, at a level of about 1% by weight, based on the weight of the solution. However, silica aerogels are extremely fine and very expensive and, because of their low bulk density, present storage and handling problems and constitute a health hazard.

Various attempts have been made to use organoclays as gelling agents for unsaturated polyester resins, which organoclays are generally smectite clays, e.g. montmorillonite, bentonite, hectorite or the like, at least part of the exchangeable cations of which are replaced by quaternary ammonium cations containing at least one alkyl group having from 10 to 24 carbon atoms.

SUMMARY OF THE INVENTION

According to one aspect of the present invention, there is provided an organophilic composition which comprises a mixture of a smectite clay and a particulate second inorganic material, the mixture having been treated with a quaternary ammonium compound which is capable of rendering the smectite clay organophilic and the second inorganic material constituting at least 5% by weight of the mixture of smectite clay, second inorganic material and quaternary ammonium compound.

The smectite clay may be, for example, bentonite, montmorillonite, hectorite, saponite or fullers earth.

The second inorganic material may be, for example, finely divided silica having an average particle diameter in the range from 0.005 μm to 0.5 μm. Preferably, the second inorganic material constitutes from 10% to 50% by weight of the mixture of smectite clay, second inorganic material and quaternary ammonium compound.

Advantageously, the quaternary ammonium compound has at least one alkyl radical having from 10 to 24 carbon atoms and most preferably is one which can be represented by the general fomula:

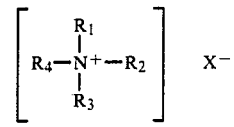

wherein $R_1$ is a saturated or unsaturated alkyl group having from 10 to 24 carbon atoms, $R_2$ and $R_3$ which may be the same or different, are each a saturated or unsaturated alkyl group having from 1 to 24 carbon atoms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, I, $NO_2$, $CH_3SO_4$ or $CH_3.COO$. Examples of such quaternary ammonium compounds are the methyl benzyl dialkyl ammonium chlorides, the dimethyl dialkyl ammonium chlorides, the dimethyl benzyl alkyl ammonium chlorides, the benzyl trialkyl ammonium chlorides and the methyl trialkyl ammonium chlorides in which the alkyl group is a mixture of hydrocarbon radicals derived from tallow having from 14 to 20 carbon atoms but in which $C_{18}$ radicals predominate. (A typical analysis of such a mixture of hydrocarbon radicals contained in tallow is: $C_{14}$ 4.5%; $C_{15}$ 0.5%; $C_{16}$ 30.5%; $C_{17}$ 1.5%; $C_{18}$ 62.0% and $C_{20}$ 1.0%.) The hydrocarbon radicals may be partially unsaturated as in natural tallow or may be substantially completely saturated as a result of treating the tallow with hydrogen in the presence of a suitable catalyst.

Most preferably, the mixture of smectite clay and second inorganic material is treated with a mixture of dimethyl di(hydrogenated tallow) ammonium chloride (2M2HT) and dimethyl benzyl hydrogenated tallow ammonium chloride (2MBHT) in proportions ranging from 25 mol % of 2MBHT and 75 mol % of 2M2HT to 100 mol % of 2MBHT and 0 mol % of 2M2HT.

It is also preferred to treat the mixture of smectite clay and second inorganic material with a quantity of quaternary ammonium compound or mixture of quaternary ammonium compounds such as to provide from 95 to 140 milliequivalents of quaternary ammonium compound(s) per 100 g of dry smectite clay.

According to another aspect of the present invention there is provided a process for preparing an organophilic composition, which process comprises preparing an aqueous suspension comprising a mixture of a smectite clay and a particulate second inorganic material, mixing with this aqueous suspension a quaternary ammonium compound capable of rendering the smectite clay organophilic, either in the molten state or in the form of an emulsion in water, and subjecting the resultant mixture to high shear mixing for a time sufficient to dissipate in the mixture at least 100 KJ of energy per Kg of dry solids in the mixture, the second inorganic material being used in an amount sufficient to provide at least 5% by weight of the final mixture of smectite clay, second inorganic material and quaternary ammonium compound.

In the process of the present invention, the high shear mixing is preferably effected by passing the suspension through a homogeniser of the type in which the suspension is forced in the form of a thin film edgewise through a thin, hard surfaced gap under a pressure of at least 250 pounds per square inch (1.7 MPa) and at a high velocity. A suitable homogeniser is described in British Patent Specification No. 987176 (or in U.S. Pat. Nos.

3039703 and 3162379). Such a homogeniser is manufactured by the Manton-Gaulin Company. Advantageously, the homogeniser is operated at a pressure of at least 1500 pounds per square inch (10.5 MPa). The amount of energy, in KJ per Kg of dry solids, dissipated in the mixture is given by the expression:

$$E = \frac{nP \cdot 10^3}{w}$$

where P is the pressure in MPa exerted in the Manto-Gaulin homogeniser, n is the number of passes through the Manton-Gaulin homogeniser, and w is the weight in grams of dry solids in 1 liter of the aqueous mixture.

The mixture of smectite clay and second inorganic material after reaction with the quaternary ammonium compound(s) is preferably dewatered by filtration or by centrifugation, washed with water and thermally dried under conditions such that the temperature does not exceed 100° C. for more than a few minutes. The dry material may then be pulverised to facilitate its incorporation into, for example, a cross-linkable unsaturated polyester resin composition. Alternatively, the mixture of smectite clay and second inorganic material after reaction with the quaternary ammonium compound(s) may be partially dewatered for, example, by decantation and the thickened suspension thus formed spray dried to give dry material in the form of microspheres which may not require any pulverisation.

The organophilic composition of the invention is also suitable for gelling organic solvents such as toluene and xylene and compositions containing such solvents, and for thickening polar paint compositions such as "two-pack epoxy paints". Polar paint compositions are generally paints which contain organic solvents of medium to high polarity, such as ketones, esters, glycol ether esters and alcohols. It is important that the organoclay thickener should disperse quickly and easily into the paint composition with the consumption of the minimum amount of energy. This is readily achieved using the organophilic composition of the present invention.

EMBODIMENTS OF THE INVENTION

The invention is illustrated by the following Examples.

EXAMPLE 1

An aqueous suspension of bentonite was prepared by mixing raw Wyoming sodium bentonite in a blunger with sufficient water to form a suspension containing 10% by weight of dry clay and with 1% by weight, based on the weight of dry clay, of tetrasodium pyrophosphate as a dispersing agent. The deflocculated suspension thus formed was passed through a No. 300 mesh British Standard sieve (nominal aperture 0.053 mm) and the undersize fraction was diluted to about 6% by weight of solids with water and subjected to a particle size separation in a nozzle dischage, disc centrifuge at a flow rate of 2 liters per minute. The fine fraction was then passed once through a Manton-Gaulin homogeniser at a pressure of 4000 psi (27.6 MPa). The energy dissipated in the suspension during the single pass through the Manton-Gaulin homogeniser was 673 KJ per Kg of dry clay.

Three aqueous suspensions A, B and C were prepared each containing 6% by weight of a precipitated silica having a median ultimate particle diameter of 0.03 μm. All three suspensions were formed initially by mixing the silica with the water by means of a laboratory stirrer.

Suspension A was then further treated by being passed once through the Manton-Gaulin homogeniser at a pressure of 4000 psi (27.6 MPa), the energy dissipated in the suspension being 443 KJ per Kg of dry silica.

Suspension B was further treated by means of a Silverson shrouded impeller mixer set to provide maximum shear for a time of 15 minutes. The energy dissipated in the suspension under these conditions is very difficult to estimate but it is believed to be of the order of 100 KJ per Kg.

Suspension C was given no further mechanical treatment.

The bentonite suspension was mixed with a suspension of silica in proportions such that the mixture contained 25% by weight of dry silica in the final dry organoclay/silica product and 48.9% by weight of dry clay. The remaining 26.1% is accounted for by the dry weight of the mixture of quaternary ammonium compounds. An aqueous suspension of a mixture consisting of 50 mol % of dimethyl di(hydrogenated tallow) ammonium chloride (2M2HT) and 50 mol % of dimethyl benzyl (hydrogenated tallow) ammonium chloride (2MBHT) was prepared by melting the quaternary ammonium compounds in the form in which they are available in commerce (75% by weight of the quaternary ammonium compound and 25% by weight of a mixture of isopropyl alcohol and water) and pouring them into hot water in proportions such as to form a 1.5% by weight emulsion of the mixed quaternary ammonium compounds in water.

Mixtures of bentonite suspension, silica suspension and quaternary ammonium compounds were prepared by the following methods:

1. The bentonite and silica suspensions were mixed together in the desired porportions using the Silverson mixer at the maximum shear setting for 15 minutes, during which time sufficient of the emulsion of mixed quaternary ammonium compounds was added to provide 105 milliequivalents of quaternary ammonium compounds per 100 g of dry bentonite.
2. The bentonite and silica suspensions were mixed together using the Manton-Gaulin homogeniser for one pass at 4000 psi (27.5 MPa) and the emulsion of mixed quaternary ammonium compounds was added to the feed container of the Manton-Gaulin homogeniser in the same proportions as in method 1. The energy dissipated in the suspension was 1365 KJ per Kg of total dry solids.
3. The bentonite and silica suspensions were mixed together using the laboratory stirrer and the emulsion of mixed quaternary ammonium compounds was added as the stirring proceeded in the same proportions as in method 1.
4. The bentonite suspension and the emulsion of mixed quaternary ammonium compounds were mixed together using the Manton-Gaulin homogeniser for one pass at 4000 psi (27.6 MPa) and the suspension of silica was added to the feed container of the Manton-Gaulin homogeniser. The energy dissipated in the suspension was 1024 KJ per Kg of total dry solids.

A further mixture was prepared, as a control, by mixing together the bentonite suspension only and sufficient of the emulsion of mixed quaternary ammonium compounds in proportions such as to provide 105 milliequivalents of quaternary ammonium compounds per 100 g of dry bentonite using the Manton-Gaulin homogeniser for one pass at 4000 psi (27.6 MPa). The energy dissipated in the suspension was 1402 KJ per Kg of total dry solids.

In each case the organoclay suspension was filtered on a Buchner funnel, washed with hot water and dried for 16 hours at 60° C. in an air-swept oven. The dry product was then milled to pass through a seive of nominal aperture 0.080 mm.

1% by weight of each dry organoclay composition was incorporated into an unsaturated polyester resin composition using a laboratory stirrer rotating at 3,500 rpm. The resin was a rapid-curing, general-purpose polyester resin marketed by the Scott Bader Company Limited under the trade name "CRYSTIC 196". ("CRYSTIC" is a Registered Trade Mark), and, is believed to be a co-polymer of o-phthalic acid, fumaric acid and propylene glycol, having a number average molecular weight of about 3000.

The viscosity of the polyester resin composition containing the organoclay as a gelling agent was measured using a Brookfield Viscometer at a spindle speed of 0.5 rpm.

The results obtained are set forth in Table I.

TABLE I

| Silica suspension | Mixing Method | Viscosity (mPa.s) | Thixotropy Index |
|---|---|---|---|
| No silica | Manton-Gaulin | 1300 | 2.30 |
| C | 3 | 600 | 1.80 |
| B | 1 | 2800 | 2.78 |
| A | 2 | 3200 | 2.78 |
| A | 3 | 800 | 2.00 |
| A | 4 | 1280 | 2.30 |

These results show that in order to achieve a good gelling effect in the polyester resin, the silica suspension must be mixed with the bentonite suspension before the bentonite is contacted with the quaternary ammonium compounds, and that both the silica suspension and the bentonite/silica/quaternary ammonium compound mixture must be subjected to high shear mechanical working such that at least 100 KJ of energy per Kg of dry total solids is dissipated in the suspension.

The thixotropy index referred to in Table 1 is defined as the ratio of the viscosity of the composition as measured with a Brookfield Viscometer at 5 rpm to the viscosity measured with a Brookfield Viscometer at 50 rpm. The value of the thixotropy index should be as high as possible where shear thinning or pseudoplastic properties are sought.

EXAMPLE 2

The bentonite suspension and silica suspension "A" prepared as described in Example 1 above were mixed together in proportions such as to give 25% by weight of dry silica in the final dry organoclay/silica product and in the range of from 46.3% to 51.8% by weight of dry bentonite, depending upon the effective molecular weight of the mixture of quaternary ammonium compounds, and samples of the mixed suspension were passed once through the Manton-Gaulin homogeniser at 4000 psi (27.6 MPa). In each case there was added to the feed container of the Manton-Gaulin homogeniser sufficient of an emulsion containing 1% by weight of a mixture of 2M2HT and 2MBHT to provide 105 milliequivalents of mixed quaternary ammonium compounds per 100 g of dry bentonite, but the 2M2HT and the 2MBHT were mixed in different proportion in each case.

In each case the organoclay suspension was filtered, washed, dried and milled as described in Example 1 and 1% by weight of each dry organoclay was stirred into the same polyester resin composition as was described in Example 1. The viscosity of each polyester resin sample after the addition of the organoclay was measured by means of a Brookfield Viscometer at a spindle speed of 0.5 rpm and the results obtained are set forth in Table II.

TABLE II

| mole % of | | % by weight of | | Viscosity (mPa.s) | Thixotropy Index |
|---|---|---|---|---|---|
| 2MBHT | 2M2HT | bentonite | quaternary ammonium compounds | | |
| 0 | 100 | 46.3 | 28.7 | 1200 | 1.90 |
| 25 | 75 | 47.5 | 27.5 | 1800 | 2.40 |
| 50 | 50 | 48.9 | 26.1 | 3200 | 2.78 |
| 75 | 25 | 50.3 | 24.7 | 3800 | 2.9 |
| 100 | 0 | 51.8 | 23.2 | 3600 | 2.8 |

EXAMPLE 3

The bentonite suspension and silica suspension "A" prepared as described in Example 1 above were mixed together in proportions such as to give 25% by weight of dry silica and 48.9% by weight of dry bentonite in the final dry organoclay/silica product, the remaining 26.1% being accounted for by the dry weight of the mixture of quaternary ammonium compound. Samples of the mixed suspension were passed once through the Manton-Gaulin homogeniser at 4000 psi (27.6 MPa). In each case there was added to the feed container of the Manton-Gaulin homogeniser a quantity of an emulsion containing 1% by weight of a mixture consisting of 75 mol % of 2MBHT and 25 mol % of 2M2HT, the quantity being varied in each case in order to provide a different number of milliequivalents of mixed quaternary ammonium compounds per 100 g of dry bentonite.

In each case the organoclay suspension was filtered, washed, dried and milled as described in Example 1, and 1% by weight of each dry organoclay was stirred into the same polyester resin composition as was described in Example 1. The viscosity of each polyester resin after the addition of the organoclay was measured by means of a Brookfield Viscometer at spindle speed of 0.5 rpm and the results obtained are set forth in Table III.

TABLE III

| Milliequivalents of quarternary ammonium compounds per 100 g of bentonite | % by weight of | | Viscosity (mPa.s) | Thixotropy Index |
|---|---|---|---|---|
| | bentonite | quaternary ammonium compounds | | |
| 85 | 53.7 | 21.3 | 300 | 1.15 |
| 90 | 52.8 | 22.2 | 800 | 1.90 |
| 95 | 51.9 | 23.1 | 2300 | 2.50 |
| 100 | 51.1 | 23.9 | 3200 | 2.80 |
| 105 | 50.3 | 24.7 | 3800 | 2.90 |
| 110 | 49.5 | 25.5 | 3400 | 3.10 |
| 115 | 48.8 | 26.2 | 3600 | 3.00 |
| 120 | 48.0 | 27.0 | 3000 | 2.50 |

EXAMPLE 4

The bentonite suspension and silica suspension "B" prepared as described in Example 1 above were mixed together in various proportions to give mixed suspensions each containing a different percentage by weight of silica. Each mixed suspension was prepared using the Silverson mixer at the maximum shear setting for 15 minutes. In each case there was added to the mixed suspension as mixing proceeded a quantity of an emulsion containing 1% by weight of a mixture consisting of 50 mol % of 2MBHT and 50 mol % of 2M2HT sufficient to provide 105 milliequivalents of mixed quaternary ammonium compounds per 100 g of dry bentonite.

In each case the organoclay suspension was filtered, washed, dried and milled as described in Example 1, and 1% by weight of each dry organoclay was stirred into the same polyester resin composition as was described in Example 1. The viscosity of each polyester resin after the addition of the organoclay was measured by means of a Brookfield Viscometer at a spindle speed of 0.5 rpm and the results obtained are set forth in Table IV.

TABLE IV

| Percentage by weight of | | | | |
|---|---|---|---|---|
| silica | bentonite | quarternary ammonium compounds | Viscosity (mPa.s) | Thixotropy Index |
| 0 | 65 | 35 | 2000 | 2.35 |
| 10 | 58.7 | 31.2 | 2500 | 2.57 |
| 25 | 48.9 | 26.1 | 2800 | 2.78 |
| 40 | 39.0 | 21.0 | 2000 | 2.50 |
| 75 | 16.3 | 8.7 | 400 | 1.25 |
| 100 | 0 | 0 | 400 | 1.02 |

EXAMPLE 5

Two-pack epoxy enamel paint

An aqueous suspension of bentonite was prepared by mixing raw Wyoming sodium bentonite in a blunger with sufficient water to form a suspension containing 10% by weight of dry clay. The suspension thus formed was fed to a scroll-type centrifuge which removed substantially all of the particles larger than 50 microns. The degritted bentonite suspension was then diluted with water to a solids content of 4% by weight and passed through a No. 300 mesh British Standard sieve. The undersize fraction was subjected to a particle size separation in a nozzle discharge, disc centrifuge at a flow rate of 1 liter per minute. The fine fraction produced by the centrifuge had a solids content of 2.5% by weight.

An aqueous suspension of precipitated silica was also prepared by mixing with water by means of laboratory stirrer sufficient of a precipitated silica having an average particle diameter of 0.4 micron and a specific surface area of 200 $m^2g^{-1}$ to form a suspension containing 4.3% by weight of dry silica.

The bentonite fine fraction and the precipitated silica suspension were mixed together in proportions such that the final dry organoclay product contained 20% by weight of silica and the mixed suspension was passed once through the Manton-Gaulin homogeniser at a pressure of 4000 psi (27.6 MPa), the energy dissipated in the emulsion being 968 KJ per kg of dry solids.

An aqueous suspension of 2MBHT was prepared by melting the quaternary ammonium compound/isopropyl alcohol mixture which is available in commerce and pouring the molten mixture into hot water in proportions such as to form a 1% by weight emulsion of 2MBHT in water. The emulsion was passed once through the Manton-Gaulin homogeniser at a pressure of 4000 psi (27.6 MPa), the energy dissipated in the emulsion being 2769 KJ per kg of dry solids.

Portions of the suspension of the bentonite/silica mixture were mixed with portions of the emulsion of 2MBHT emulsion at 65° C. in a paddle mixer to give the proportions of silica, bentonite and quaternary ammonium compound given in Table V, and in each case the mixture was agitated for 30 minutes and then passed once through the Manton-Gaulin homogeniser at a pressure of 4000 psi (27.6 MPa). Each organoclay portion was then filtered, dried in an air swept oven for 16 hours at 60° C. and milled to pass through a sieve of nominal aperture 0.080 mm.

Each portion was incorporated into pack A of a two pack white epoxy paint, of which pack A is the base containing the epoxy resin and pack B is the polyamide curing agent solution.

Pack A was prepared by mixing together the following ingredients which are listed in their order of addition:

| | Grams |
|---|---|
| 75% by weight solution of epoxy resin in xylene | 157.0 |
| Solvent mixture (see below) | 47.5 |
| Urea formaldehyde resin as flow control agent | 7.0 |
| Dispersing agent | 3.5 |
| Titanium dioxide pigment | 149.0 |

The above ingredients were mixed together in a water-cooled pot using a 4 cm diameter Cowles blade at 4000 rpm. The mixing was continued until a small sample spread on a Hegman gauge gave a reading of less than 5 microns.

The speed of the Cowles blade was then reduced to 2000 rpm and there were then added:

| | Grams |
|---|---|
| Solvent mixture (see below) | 42.5 |
| Organoclay | 2.5 |

When all the organoclay had been added the speed of the Cowles blade was again increased to 4000 rpm and, for each batch of pack A, small samples were taken at 1 minute intervals and spread on a Hegman gauge. For each batch there was recorded the time taken to reach a state of dispersion such that the Hegman gauge gave a reading of less than 10 microns (see Table V below).

As a comparison, further batches of pack A were prepared containing organoclays prepared in a manner similar to that described above but containg no silica and the mixing time required to reach a Hegman gauge reading of less than 10 microns was recorded (see Table V below).

Each batch of pack A was mixed with a batch of pack B prepared according to the following formulation, to form a white epoxy enamel paint

| | Grams |
|---|---|
| Polyamide liquid curing agent | 56.0 |
| Xylene | 35.0 |

The total formulation weight of the epoxy paint was 500 grams.

The solvent mixture comprised:-

| | % by weight |
|---|---|
| Ethylene glycol monoethyl ethyl acetate | 65 |
| Methyl isobuty ketone | 15 |
| Xylene | 20 |

The results obtained are set forth in Table V.

TABLE V

| % by weight of silica | meq of quarternary ammonium compound per 100 g of bentonite | % by weight of bentonite | % by weight of quarternary ammonium compound | Energy dissipated in homogeniser (KJ per kg dry solids) | Time to reach Hegman gauge reading of less than 10 u (min) |
|---|---|---|---|---|---|
| 20 | 91 | 57.6 | 22.4 | 1371 | 12 |
| 20 | 100 | 56.1 | 23.9 | 1396 | 4 |
| 20 | 114 | 53.8 | 26.2 | 1434 | 2 |
| 20 | 126 | 52.0 | 28.0 | 1464 | 4 |
| 0 | 89 | 72.5 | 27.5 | 1549 | >30 |
| 0 | 101 | 69.9 | 30.1 | 1592 | 20 |
| 0 | 113 | 67.5 | 32.5 | 1632 | 10 |
| 0 | 119 | 66.3 | 33.7 | 1652 | >30 |

EXAMPLE 6 Gelling toluene

Aqueous suspensions of bentonite and precipitated silica were prepared using the same starting materials and preparative methods as described in Example 5.

The suspension of finely divided bentonite and the suspension of precipitated silica were mixed together in different proportions and each mixed suspension was passed once through the Manton-Gaulin homogeniser at a pressure of 27.6 MPa.

An aqueous suspension containing 2MBHT and 2M2HT in the proportions 75 mole % 2MBHT to 25 mole % 2M2HT was prepared by melting the quaternary ammonium compound/isopropyl alcohol mixtures and pouring the molten mixture into hot water to form an emulsion containing 1% by weight of the mixed quaternary ammonium compounds in water.

Portions of the emulsion of mixed quaternary ammonium compounds were circulated through the Manton-Gaulin homogeniser at a pressure of 27.6 MPa and in each case the bentonite/precipitated silica suspension was added to the feed hopper of the homogeniser in proportions such that there were present in the mixture 105 meq of quaternary ammonium compounds/100 g of dry bentonite. In each case the mixture received the equivalent of one pass through the homogeniser. The organoclay/silica composition thus formed was then filtered, washed, dried in an air-swept oven at 60° C. for 16 hours and milled to pass through a sieve of nominal aperture 0.080 mm.

Each sample of dry organoclay/silica composition was tested for its gelling properties in toluene by dispersing a 6 g sample of the composition in 340 ml of toluene in a Waring Blendor rotating at 16500 rpm for 3 minutes. The mixture was allowed to stand for 2 hours and the viscosity then measured using a Brookfield Viscometer at a speed of 50 rpm. The results obtained are set out in Table VI

TABLE VI

| % by weight in organoclay/silica composition of | | | Energy dissipated in homogeniser (KJ Kg$^{-1}$) in | | Viscosity (mPas) |
|---|---|---|---|---|---|
| silica | bentonite | quaternary ammonium compounds | silica/ bentonite | organo- clay/ silica | |
| 0 | 67.1 | 32.9 | 1089 | 1639 | 100 |
| 5 | 63.7 | 31.3 | 1055 | 1589 | 210 |
| 10 | 60.4 | 29.6 | 1023 | 1537 | 200 |
| 15 | 57.0 | 28.0 | 992 | 1487 | 290 |
| 20 | 53.7 | 26.3 | 963 | 1436 | 330 |
| 25 | 50.3 | 24.7 | 935 | 1386 | 450 |
| 30 | 46.9 | 23.1 | 908 | 1335 | 420 |
| 35 | 43.6 | 21.4 | 882 | 1284 | 520 |

EXAMPLE 7

Aqueous suspensions of bentonite and precipitated silica were prepared as described in Example 5 and were mixed together in proportions such that the final organoclay/silica composition contained 20% by weight of dry silica. Each mixed suspension was passed once through the Manton-Gaulin homogeniser at a pressure of 27.6 MPa.

A 1% by weight aqueous emulsion of a mixture consisting of 75 mole % 2MBHT and 25 mole % 2M2HT was prepared as described in Example 6. Portions of this emulsion were circulated through the Manton-Gaulin homogeniser at a pressure of 27.6 MPa and in each case a bentonite/precipitated silica suspension was added to the feed hopper of the homogeniser in proportions such that in each case there was present a different number of milliequivalents of quaternary ammonium compounds/100 g of dry bentonite. In each case the mixture received the equivalent of one pass through the homogeniser. The organoclay/silica compositions thus formed were then filtered, washed, dried in an air-swept oven at 60° C. for 16 hours and milled to pass through a sieve of nominal aperture 0.080 mm.

Each sample of dry organoclay/silica composition was tested for its gelling properties in toluene by the method described in Example 6 and the results obtained are set forth in Table VII below:

TABLE VII

| meq quaternary ammonium compounds per 100 g bentonite | % by weight in organoclay/silica composition of | | Energy dissipitated in homogeniser (KJ kg⁻¹ in | | Viscosity (mPas) |
|---|---|---|---|---|---|
| | bentonite | quaternary ammonium compounds | silica/bentonite | organoclay/silica | |
| 90 | 56.3 | 23.7 | 967 | 1392 | 800 |
| 100 | 54.4 | 25.6 | 964 | 1424 | 530 |
| 105 | 53.7 | 26.3 | 963 | 1436 | 350 |
| 110 | 53.0 | 27.0 | 962 | 1447 | 124 |
| 120 | 51.3 | 28.7 | 959 | 1476 | 40 |

EXAMPLE 8

Aqueous suspensions each consisting of a mixture of water bentonite and precipitated silica were prepared as described in Example 7. Each mixed suspension contained bentonite and silica in proportions such that the final organoclay/silica composition prepared from each contained 25% by weight of dry silica and was passed once through the Manton-Gaulin homogeniser at a pressure of 27.6 MPa.

Emulsions were prepared containing 1% by weight of mixtures in various proportions of 2MBHT and 2M2HT according to the method described in Example 6. Each batch of emulsion was circulated through the Manton-Gaulin homogeniser at a pressure of 27.6 MPa and in each case a bentonite/precipitated silica suspension was added to the feed hopper of the homogeniser in proportions such that there were present 105 meq of quaternary ammonium compounds per 100 g of dry bentonite. In each case the mixture received the equivalent of one pass through the homogeniser. The organoclay/silica compositions thus formed were then filtered, washed, dried in an air-swept oven at 60° C. for 16 hours and milled to pass through a sieve of nominal aperture 0.080 mm.

Each sample of dry organoclay/silica composition was tested for its gelling properties in toluene by the method described in Example 6 and the results obtained are set forth in Table VIII below:

TABLE VIII

| Mole % in quaternary ammonium compound mixture of | | % by weight in organoclay/silica composition of | | Energy dissipated in homogeniser (KJ kg⁻¹) in | | Viscosity (mPas) |
|---|---|---|---|---|---|---|
| 2MBHT | 2M2HT | bentonite | quaternary ammonium compounds | silica/bentonite | organoclay silica | |
| 100 | 0 | 51.8 | 23.2 | 938 | 1361 | 470 |
| 75 | 25 | 50.3 | 24.7 | 935 | 1386 | 430 |
| 50 | 50 | 48.9 | 26.1 | 932 | 1409 | 190 |
| 25 | 75 | 47.5 | 27.5 | 929 | 1433 | 30 |
| 0 | 100 | 46.3 | 28.7 | 926 | 1453 | 30 |

We claim:

1. An organophilic composition, which comprises a mixture of a smectite clay and finely divided silica, the mixture having been treated with a quaternary ammonium compound which has at least one alkyl radical having from 10 to 24 carbon atoms and which is capable of rendering the smectite clay organophilic, and the finely divided silica constituting at least 5% by weight of the mixture of smectite clay, finely divided silica and quaternary ammonium compound.

2. A composition as claimed in claim 1, wherein the finely divided silica has an average particle diameter in the range from 0.005 μm to 0.5 μm.

3. A composition as claimed in claim 1, wherein the finely divided silica constitutes from 10% to 50% by weight of the mixture of smectite clay, finely divided silica and quaternary ammonium compound.

4. A composition as claimed in claim 1, wherein the quaternary ammonium compound is one which can be represented by the general formula:

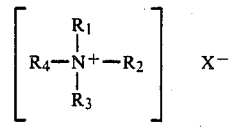

wherein $R_1$ is a saturated or unsaturated alkyl group having from 10 to 24 carbon atoms, $R_2$ and $R_3$ which may be the same or different, are each a saturated or unsaturated alkyl group having from 1 to 24 carbon atoms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, I, $NO_2$, $CH_3SO_4$ or $CH_3.COO$.

5. A composition according to claim 1, wherein mixture of smectite clay and second finely divided silica is treated with a mixture of dimethyl di(hydrogenated tallow) ammonium chloride and dimethyl benzyl hydrogenated tallow ammonium chloride.

6. A composition according to claim 5, wherein said mixture comprises from 25 mol % to 100 mol % of dimethyl benzyl hydrogenated tallow ammonium chloride and from 75 mol % to 0% of dimethyl di(hydrogenated tallow) ammonium chloride.

7. A composition as claimed in claim 1, wherein the mixture of smectite clay and second finely divided silica is treated with a quantity of quaternary ammonium compound or mixture of quaternary ammonium compounds such as to provide from 95 to 120 milliequivalents of quaternary ammonium compound(s) per 100 g of dry of smectite clay.

* * * * *